(12) United States Patent
Jeong (10) Patent No.: US 12,463,195 B2
(45) Date of Patent: Nov. 4, 2025

(54) CALENDERING APPARATUS FOR THE PRODUCTION OF AN ELECTRODE

(71) Applicant: Bayerische Motoren Werke Aktiengesellschaft, Munich (DE)

(72) Inventor: Dongho Jeong, Neubiberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 319 days.

(21) Appl. No.: 18/280,735

(22) PCT Filed: Feb. 23, 2022

(86) PCT No.: PCT/EP2022/054497
§ 371 (c)(1),
(2) Date: Sep. 7, 2023

(87) PCT Pub. No.: WO2022/189145
PCT Pub. Date: Sep. 15, 2022

(65) Prior Publication Data
US 2024/0304782 A1    Sep. 12, 2024

(30) Foreign Application Priority Data
Mar. 8, 2021   (DE) .................... 10 2021 105 459.1

(51) Int. Cl.
*H01M 4/04*   (2006.01)
*B29C 33/38*  (2006.01)
(Continued)

(52) U.S. Cl.
CPC ....... *H01M 4/0435* (2013.01); *B29C 33/3828* (2013.01); *B29C 43/24* (2013.01);
(Continued)

(58) Field of Classification Search
CPC ................. H01M 4/0435; B65H 27/00; B29C 33/3828
See application file for complete search history.

(56) References Cited

U.S. PATENT DOCUMENTS 5,935,884 A * 8/1999 Williams ............... H01M 50/44
442/364
8,461,496 B2 * 6/2013 Jeong ..................... H05B 6/104
219/637
(Continued)

FOREIGN PATENT DOCUMENTS

| DE | 698 15 845 T2 | 5/2004 |
|---|---|---|
| DE | 10 2012 224 301 A1 | 6/2014 |
| DE | 10 2016 112 868 A1 | 1/2018 |
| JP | 2006-175501 A | 7/2006 |

OTHER PUBLICATIONS

International Search Report (PCT/ISA/210) issued in PCT Application No. PCT/EP2022/054497 dated Jun. 21, 2022 with English translation (4 pages).
(Continued)

*Primary Examiner* — Benjamin A Schiffman
(74) *Attorney, Agent, or Firm* — Crowell & Moring LLP (57) ABSTRACT

A calendering apparatus is provided for the mechanical compacting of an electrode, in particular of a flat form. The calendering apparatus includes a compacting device and a guide roller. The guide roller is configured to feed the electrode to the compacting device during the operation of the calendering apparatus. The guide roller has first regions and second regions in certain parts of its rolling surface, and the first and second regions have different thermal conductivities.

8 Claims, 6 Drawing Sheets

(51) Int. Cl.
  *B29C 43/24* (2006.01)
  *B29C 43/46* (2006.01)
  *B30B 3/04* (2006.01)
  *B30B 9/28* (2006.01)
  *B30B 15/30* (2006.01)
  *B30B 15/34* (2006.01)
  *B65H 27/00* (2006.01)
  *B29L 31/34* (2006.01)

(52) U.S. Cl.
  CPC ............ *B29C 43/46* (2013.01); *B30B 3/04* (2013.01); *B30B 9/28* (2013.01); *B30B 15/30* (2013.01); *B30B 15/34* (2013.01); *B65H 27/00* (2013.01); *H01M 4/0471* (2013.01); *B29C 2043/461* (2013.01); *B29K 2909/02* (2013.01); *B29L 2031/3468* (2013.01); *B65H 2404/53* (2013.01); *B65H 2515/40* (2013.01); *Y02E 60/10* (2013.01)

(56) References Cited

U.S. PATENT DOCUMENTS

| | | | |
|---|---|---|---|
| 9,242,396 B2 * | 1/2016 | Haynes | B29C 48/08 |
| 2011/0039138 A1 * | 2/2011 | Jeong | H01M 4/0435 |
| | | | 429/94 |
| 2024/0145667 A1 * | 5/2024 | Jeong | H01M 10/0525 |

OTHER PUBLICATIONS

German-language Written Opinion (PCT/ISA/237) issued in PCT Application No. PCT/EP2022/054497 dated Jun. 21, 2022 with English translation (8 pages).

German-language Search Report issued in German Application No. 10 2021 105 459.1 dated Sep. 13, 2021 with partial English translation (10 pages).

* cited by examiner

CALENDERING APPARATUS FOR THE PRODUCTION OF AN ELECTRODE

BACKGROUND AND SUMMARY OF THE INVENTION

The present invention relates to a calendering apparatus for production of an electrode for a battery cell, especially for a lithium ion cell.

Electrodes, especially electrodes having mechanically compacted active material, are used, for example, in battery cells for electric vehicles.

What is called calendering is a known method in the production of electrodes. In this method, the electrodes, which have an electrically conductive carrier substrate, usually composed of metal, and an active material applied thereto which is of electrochemical relevance with regard to the use of the electrode in a galvanic element, are subjected to high mechanical stress during production thereof in order to attain a high bulk density, especially in the active material. The electrodes are conducted here between two rolls that exert a mechanical pressure on the electrode, such that it undergoes compaction as it is conducted through and hence the bulk density of the electrode is increased. A higher bulk density of electrodes regularly enables a higher energy density of a battery cell in which these electrodes are used.

Because of the high mechanical pressure on the electrode in the compacting operation, mechanical stresses often build up within the electrode, which can lead to deformations of the electrode. This is disadvantageous in further processing, for example in the case of a further compression or in the case of subsequent winding of the electrode on a roll. In particular, a deformed region of the electrode can adversely affect this further manufacturing process, or even make it impossible.

Because of such deformations, it may additionally become more difficult or even impossible to apply additional safety coatings on uncoated regions of the electrode substrate in a reliable manner.

The invention is based on the object of providing an improved calendering apparatus with which deformation of the electrodes to be produced in the course of calendering can be counteracted.

This object is achieved according to the teaching of the claimed invention.

The invention relates to a calendering apparatus for mechanical compaction of an electrode, especially a two-dimensional electrode, wherein the apparatus comprises a compacting device, and a guide roll with a rolling surface, wherein the guide roll is configured to feed the electrode to the compacting device in operation of the calendering apparatus, wherein the guide roll has first regions and second regions in sections on its rolling surface, and wherein the first and the second regions have different thermal conductivities.

The term "rolling surface" in the context of embodiments of the invention is especially understood to mean the outer surface of a roll that may be in the form of a cylinder or rotary cylinder, which can be defined after one revolution as the roll turns about the axis of rotation.

The mechanical compaction of the electrode creates mechanical stresses within the electrode. These stresses, or else stress residues, in the electrode build up mainly in the binder structure thereof. Uncontrolled release of these mechanical stresses can lead to what is called a rebound effect, where the electrode expands and, as a result, has a greater thickness than immediately after the mechanical compaction. Therefore, in order to avoid deformations, it is helpful to release the stresses in a controlled manner or not to allow them to arise at all. In particular, the stresses can be released more quickly at high temperatures than at lower temperatures. High temperatures in the context of embodiments of the invention are especially temperatures of 100° C.-160° C., preferably of 120° C.-150° C. It is therefore advantageous to send the electrode to the compaction device in a heated state, which can especially be effected by prior heating. Supply of thermal energy prior to the compression has the advantage that a lower level of stresses builds up within the electrode during the mechanical compaction. It is therefore advantageous to supply the electrode to the compaction device with minimum losses of the thermal energy supplied. This is achieved in accordance with embodiments of the invention in that a guide roll of the apparatus, provided for supply of the electrode to the compaction device, has first regions and second regions in sections on its rolling surface, wherein the first and the second regions have different thermal conductivities, such that the loss of thermal energy from the electrode to or via the guide roll is at least reduced during the conveying of the electrode through the regions with the lower thermal conductivity.

There follows a description of preferred embodiments of the method, each of which, unless explicitly excluded or technically impossible, may be combined as desired with one another and with the other aspects of the invention described, or used as corresponding embodiments of the latter.

In some embodiments, the guide roll has at least one thermally insulating depression in the first region, and this extends radially from the rolling surface toward the inside of the guide roll in relation to an axis. The axis may be the axis about which the roll can rotate. A depression has a thermally insulating effect since its volume comprises the surrounding gas, generally air, which typically has worse thermal conductivity than the material from which the guide roll is made, for example a metal. This advantageously achieves the effect that an electrode that has been supplied with thermal energy releases this thermal energy only partly to the guide roll when the electrode comes into mechanical contact with the guide roll.

In some embodiments, the at least one depression is in groove form, spherical form, hemispherical form or pyramidal form. These forms of the depressions, in addition to the thermally insulating effect, have the effect that contamination particles that could have collected on the surface of the electrode and could become detached during the conveying of the electrode through the guide roll and could fall into the depression have a low probability of being released from the depression and sticking again to an electrode as a defect.

In some embodiments, the guide roll has multiple depressions, where at least two of the depressions have different forms from one another. As a result, it is possible to achieve a different degree of thermal insulation in different regions of the rolling surface of the guide roll, which can be advantageous especially in the case of inhomogeneous electrode coatings with active material, in order to achieve optimal adjustment to the respective properties of the active material.

In some embodiments, the guide roll has an electrically nonconductive material on its rolling surface. This is advantageous when the guide roll is to be supplied with thermal energy by way of induction. An electromagnetic force acting between the electrode and the guide roll that moves the electrode toward or away from the guide roll can be avoided when the guide roll includes an electrically conductive material.

In some embodiments, the electrically nonconductive material includes ceramic and/or plastic. Ceramic has the advantage that, because of its crystal structure, it has mechanical stiffness, and therefore enables exact guiding of the electrode. A plastic may be stiff or flexible, and is easy and inexpensive to produce. It is also conceivable that the guide roll is produced from one of ceramic and plastic, and the depressions are reinforced with the respective other material.

In some embodiments, the guide roll includes at least one insulation element disposed in the at least one depression. This achieves an additional thermally insulating effect of the guide roll with respect to the electrode when it comes into mechanical contact with the guide roll.

Further advantages, features and possible uses of embodiments of the present invention will be apparent from the detailed description that follows, in association with the figures.

DETAILED DESCRIPTION OF THE DRAWINGS

Throughout the figures, the same reference numerals are used for the same or mutually corresponding elements of the invention.

Figure 1A:
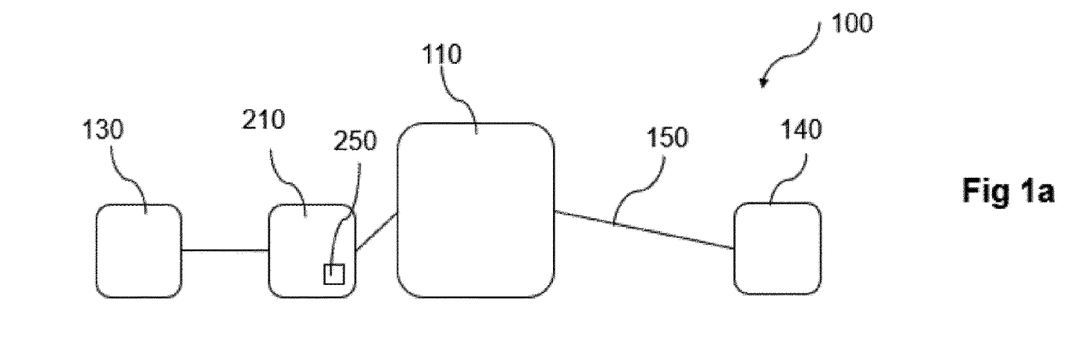
FIGS. 1a and 1b show a schematic of an arrangement comprising an additional relaxation assembly for processing of an electrode.
Figure 1B:
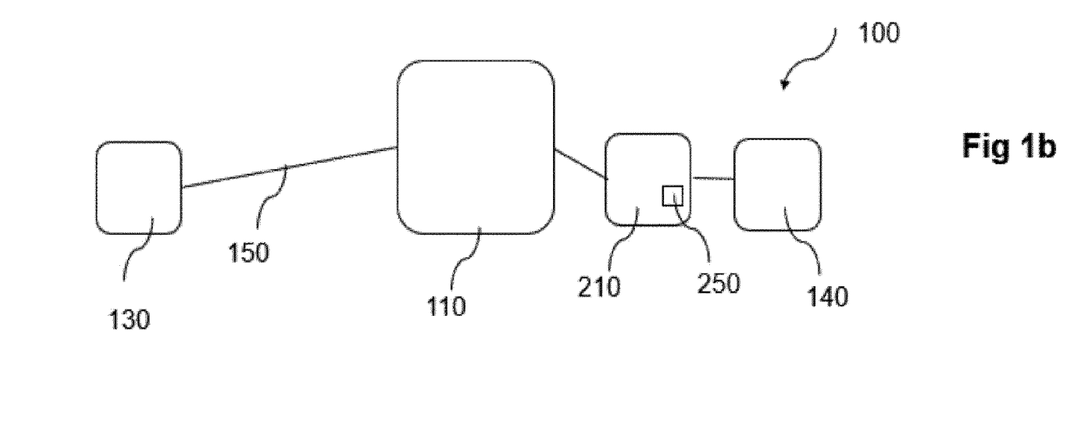

FIGS. 1a and 1b show a schematic of a compaction apparatus 100 for processing of an electrode 150. The compaction apparatus 100 has an unwinding roll 130, a relaxation module 210, a first compaction unit 110 and a winding roll 140. The first compaction unit 110 and also the second compaction unit 120 (see FIG. 4) each have a roll pair (not shown here), where the main axes of the rolls, which are of cylindrical shape, run essentially parallel to one another. The roll pairs are each disposed at a distance from one another which is lower than the thickness of the electrode supplied, and correspond to the thickness that the electrode is to have as a result of the compaction by the respective roll pair.

The electrode 150 is disposed on an unwinding roll 130, from which the electrode 150 is correspondingly unwound and supplied to the relaxation module 210. In the relaxation module 210, the electrode is supplied with thermal energy via a thermal energy source 250 disposed therein. This thermal energy is supposed to prevent mechanical stresses from building up as a result of the compaction in the compaction unit 110. Subsequently, the electrode 150 is sent to the first compaction unit 110, in which it is compressed. Downstream of the first compaction unit 110, the electrode 150 is rolled up on a winding roll 140.

According to FIG. 1b, the relaxation module 210, by contrast with FIG. 1a, is disposed not upstream of the first compaction unit 110 but downstream of the compaction unit and upstream of the winding roll 140. This achieves the effect that compactions that have arisen in the electrode 150 by virtue of the compaction in the compaction unit 110 are degraded again. The arrangement of the further components is identical to that in FIG. 1a.

Figure 2:
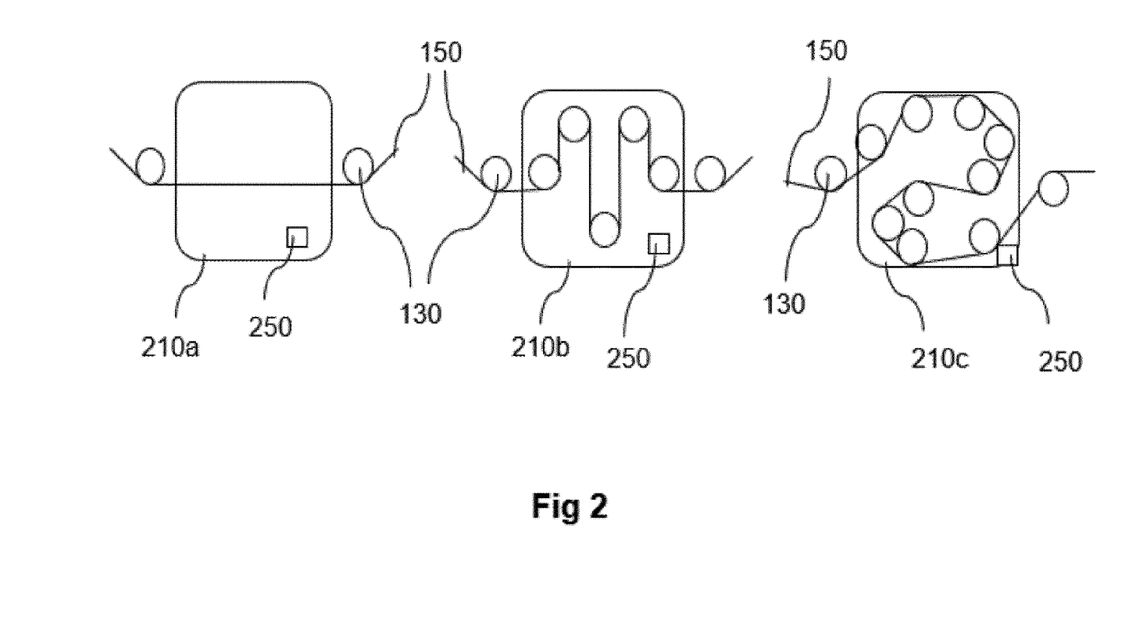
FIG. 2 shows a schematic of configurations of the relaxation module.

FIG. 2 shows a schematic of three possible configurations of the relaxation module 210, which are called relaxation module one 210a, relaxation module two 210b, and relaxation module three 210c. The relaxation modules 210a, 210b, 210c described each have two or more guide rolls 130 through which the electrode 150 is conveyed. The guide rolls 130 may also be configured as deflecting rolls, such that the electrode 150 is deflected at a particular angle from its original direction of movement while it is being conveyed. The conveying of the electrode 150 over the additional distance extends the period of time taken by the electrode 150 to cover the distance within the relaxation module. In this period of time, the electrode 150 is supplied with thermal energy via the thermal energy source 250. In this respect, the extending of the distance extends the period of time in which the electrode 150 is supplied with thermal energy. As described above, depending on the positional arrangement, buildup of stress within the electrode 150 is prevented thereby, or stress already present is dissipated again. The thermal energy source 250 is, for example, an infrared lamp heater or an induction device. The thermal energy is at a temperature between 100° C. and 160° C. An advantageous temperature has been found to be between 120° C. and 150° C., especially 150° C. The temperature may be optimized in accordance with the material composition of the electrode 150 and the thermal energy source used.

In relaxation module one 210a, the electrode 150 is conveyed by way of two guide rolls 130 that are spaced apart from one another. The guide rolls 130 are each disposed offset from the direction of movement, such that the electrode 150 undergoes deflection from its original direction. As a result, firstly, the distance covered by the electrode 150 is extended. Secondly, the deflection angle of the two guide rolls 130 can be used to control the angle at which the electrode 150 is supplied to relaxation module one 210a, and the angle at which the electrode 150 is removed from relaxation module one 210a and supplied, for example, to a compression unit 110, 120.

In relaxation module two 210b, the electrode 150 is conveyed by way of seven guide rolls 130 that are each spaced apart from one another. The electrode 150 in relaxation module two 210b is deflected on the inlet side by a guide roll 130 at an angle of essentially 90 degrees. Thereafter, the electrode 150 is deflected by three successive guide rolls, in each case by 180 degrees. This is followed by a further guide roll 130 that deflects the electrode 150 again by 90 degrees, such that the electrode 150 reattains its original direction. It is also conceivable that the distance covered is additionally extended by further 180 degree deflections. Depending on whether the electrode 150, in its reattained original direction, is to be conveyed above or below the subsequent guide rolls 130, the number of 180 degree deflections may be adjusted.

In relaxation module three 210a, the electrode 150 is conveyed by way of 11 guide rolls 130 that are each spaced apart from one another. The guide rolls 130 are arranged on a curved track, which changes its direction several times.

Figure 3:
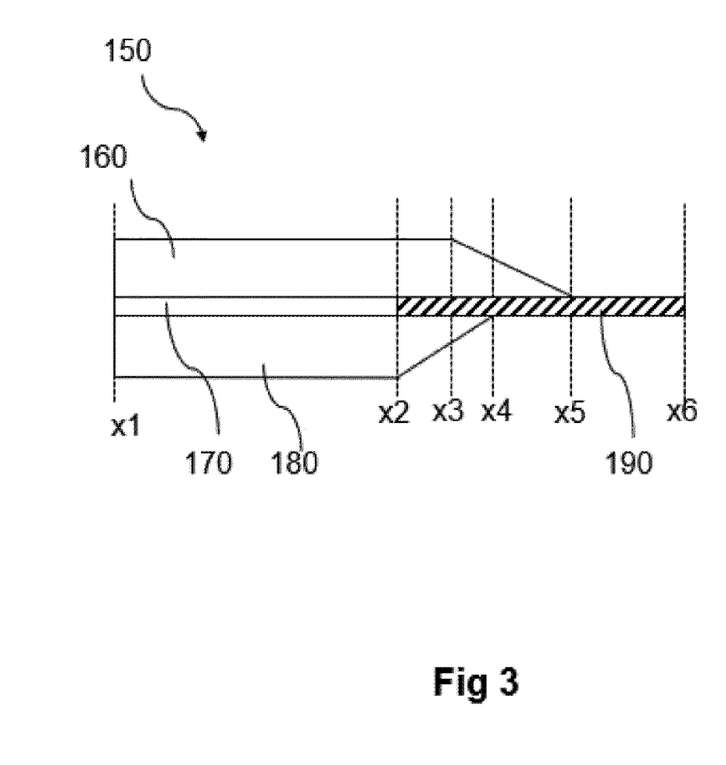
FIG. 3 shows a schematic of an electrode having regions of different coated thickness.

FIG. 3 shows a schematic of an electrode having regions of different coated thickness. The electrode 150 has an electrode foil 170 disposed between a first electrode coating 160 and a second electrode coating 180. The electrode coatings 160, 180 are electrically conductive. In addition, the electrode is divided into five regions that are respectively between the region boundaries x1-x6 shown. Accordingly, region 1 is between region boundaries x1 and x2, region 2 between region boundaries x2 and x3, region 3 between region boundaries x3 and x4, region 4 between region boundaries x4 and x5, and region 5 between region boundaries x5 and x6.

In region 1, the first electrode coating 160 and the second electrode coating 180 have the same constant thickness over the entire region.

In region 2, the first electrode coating 160 has a constant thickness over the entire region, which is identical to the thickness of the coating of region 1. The second electrode coating 180 has a decreasing thickness in the direction away from region 1.

In region 3, the first electrode coating 160 has a decreasing thickness in directions away from region 2, as does the second electrode coating 180. The thicknesses and also the decrease in the thicknesses of the first electrode coating 160 and of the second electrode coating 180 are different. The thickness of the second electrode coating 180 decreases down to zero, such that the foil is uncoated on one side at the boundary with region 4.

In region 4, one side of the foil is uncoated, while the second electrode coating 180 on the other side decreases across the region down to a value which is at least close to zero and which is at the boundary with region 5.

In region 5, the foil 170 of the electrode 150 is completely uncoated.

In regions 2 to 5 of the electrode 150 in which the foil is coated with relatively low thickness at least on one side or is uncoated, unevenness can arise in the case of compression. This can hinder frictionless conveying of the electrode 150. It is therefore advantageous to supply thermal energy especially to the regions mentioned, in order to avoid unevenness. The foil 170 is correspondingly supplied with thermal energy by the thermal energy source in a foil subregion 190 coated with lower thickness at least on one side.

Figure 4:
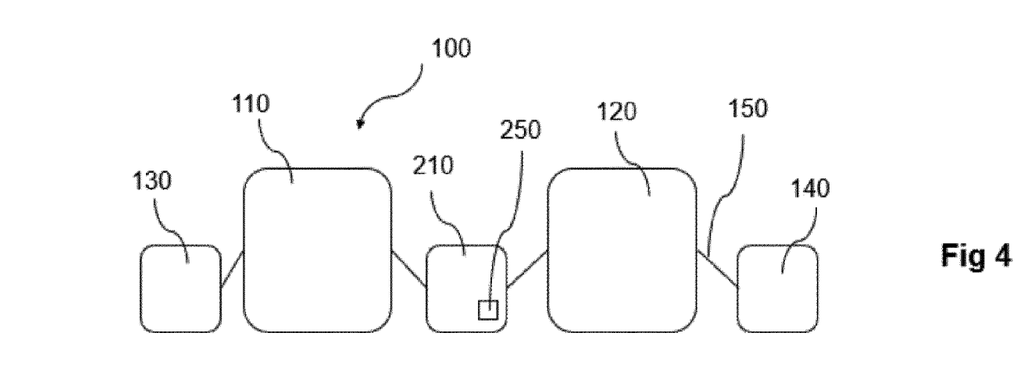
FIG. 4 shows a schematic of an arrangement having a second compaction unit.

FIG. 4 shows a schematic of a compaction apparatus 100 having a first compaction unit 110, a second compaction unit 120, and a relaxation module 210, which is disposed between the first compaction unit 110 and the second compaction unit 120 in relation to the conveying of the electrode 150, such that the electrode 150 passes through the relaxation module 210 downstream of the first compaction unit 110 and upstream of the second compaction unit 120. The relaxation module 210 has a thermal energy source 250. In addition, the compaction apparatus 100 has a guide roll 130 that supplies the electrode 150 to the first compaction unit 110. In the first compaction unit 110, the electrode is compressed to a first thickness. This gives rise to mechanical stresses in the electrode 150. These stresses are dissipated in the relaxation module 250 by the supply of thermal energy via the thermal energy source 250. Thereafter, the electrode 150 is supplied to the second compaction unit 120, in which the electrode 150 is compressed to a second thickness smaller than the first thickness. The prior supply of thermal energy prevents uncontrolled dissipation of the mechanical stresses after the first compression and also after the second compression, and the electrode 150 from expanding again.

Figure 5:
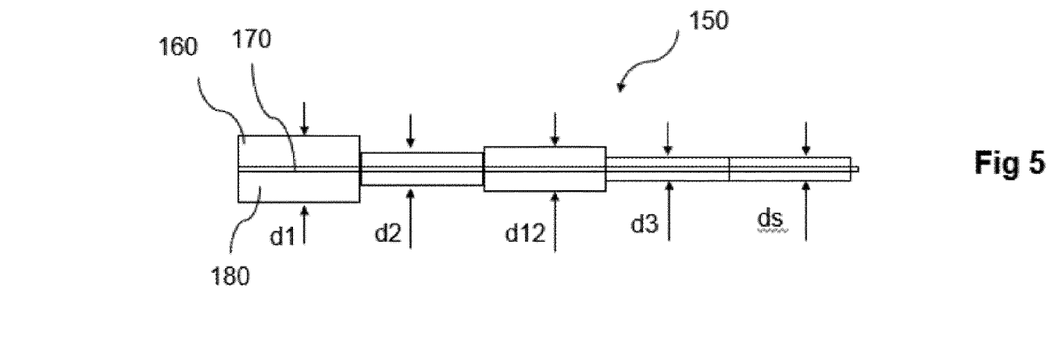
FIG. 5 shows a schematic of a change in electrode thickness based on a processing operation by the arrangement.

FIG. 5 shows a schematic of a change in thickness of an electrode 150 based on the processing by the compaction apparatus 100 according to FIG. 4. The electrode 150 has an electrode foil 170 disposed between a first electrode coating 160 and a second electrode coating 180. The first compaction unit 110 compresses the electrode 150 from the original thickness d1, with which the electrode 150 is supplied to the first compaction unit 110, to a first thickness d2. Thereafter, the electrode 150 passes through the relaxation module 210 in which the electrode 150 is supplied with thermal energy via the thermal energy source 250. This dissipates stresses within the electrode 150. However, the stresses are possibly not fully dissipated, and the rebound effect described causes the thickness of the electrode to increase from the first thickness d2 to an intermediate thickness d12, but one that is lower than the original thickness d1 of the electrode. The electrode 150 is fed with the intermediate thickness d12 to the second compaction unit 120, and compressed to the second thickness d3. The thickness of the electrode 150 then remains constant at the second thickness d3, which corresponds to the target thickness ds, because of the stresses that have been dissipated in the relaxation module 210.

FIGS. 6a-6d show a schematic of the method steps for heat treatment by way of a guide roll when there is an inhomogeneous coating.

Figures 6A, 6C:
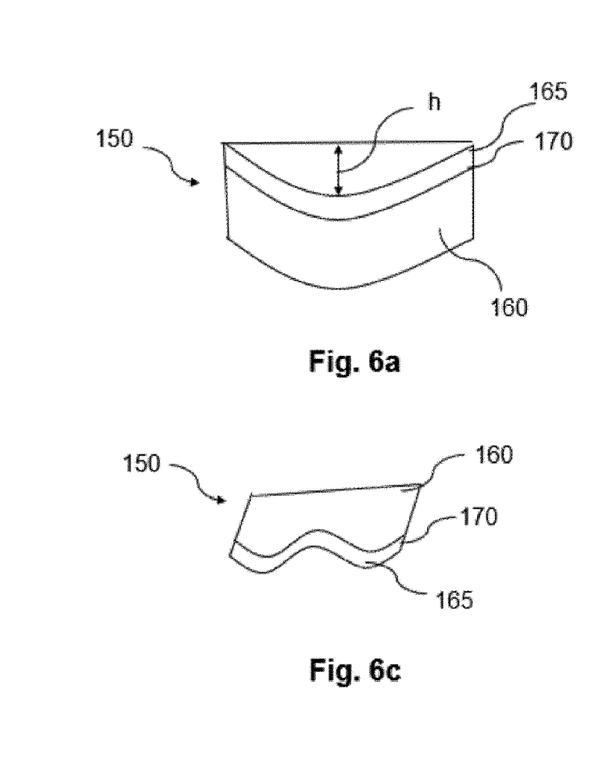
FIGS. 6a-6d show a schematic of method steps for heat treatment by way of a guide roll when there is an inhomogeneous coating.

FIG. 6a shows an electrode 150 having an electrode foil that has been coated only on one side with a first electrode coating 160, and an uncoated region 165. During a compaction, for example in the first compaction unit 110, only the coated region of the electrode 150 is compressed and correspondingly stretched along the longitudinal axis of the electrode 150. Mechanical stress on one side of the electrode 150 can result in deformation of the electrode 150. This can lead to bending of the electrode 150 toward the uncoated side of the electrode 150, which can lead to a difference in height h in the bent region.

Figure 6B:
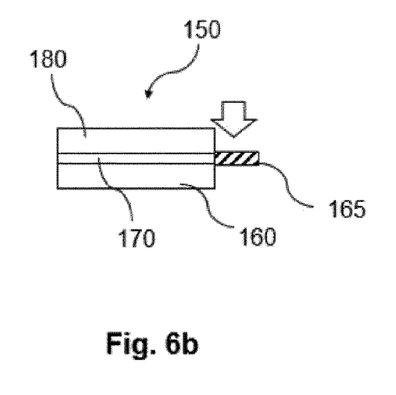

FIG. 6b shows a schematic of an electrode 150, in which an uncoated region 165 is shown. The uncoated region 165 is supplied with thermal energy in order to attenuate the bending. The thermal energy may be supplied to the uncoated region 165 by induction, for example.

FIG. 6c shows an electrode 150 that has been supplied with additional thermal energy by induction. The region that has been supplied with the thermal energy has become deformed. This deformation results from the expansion of the heated region 165 on the one hand, and the effect of an electromagnetic force by the induction on the other hand.

Figure 6D:
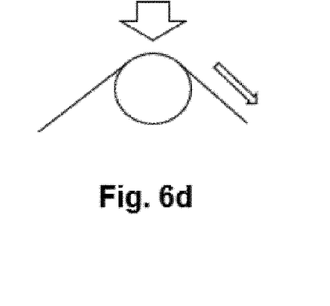

FIG. 6d shows a guide roll 130 via which the electrode 150 is supplied, while the electrode 150 is being supplied with thermal energy. In order that the uncoated region 165 does not become deformed because of differences in heat, it is necessary to supply the uncoated region 165 uniformly with thermal energy, such that the uncoated region 165 has a constant temperature over its full area. For this purpose, it is necessary that the distance between the thermal energy source and the uncoated region 165 remains constant during the supply of the thermal energy. This requires that the guide roll 130 have a constant distance from the electrode 150 while the thermal energy is being supplied. This can be achieved, for example, in that there is no electromagnetic force interaction between the electrode 150 and the guide roll 130, which can arise especially when the thermal energy is supplied to the electrode by induction and the guide roll includes a ferromagnetic material. When the guide roll comprises an electrically nonconductive material, for example a plastic, this electromagnetic force interaction may be avoided, and the distance between the guide roll 130 and the electrode 150 may be kept constant.

Figure 7:
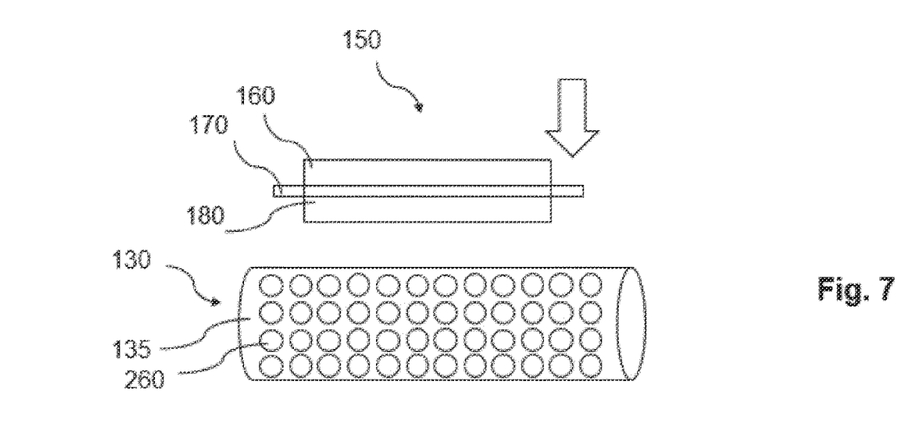
FIG. 7 shows a schematic of a guide roll with depressions and an electrode.

FIG. 7 shows a schematic of a guide roll 130 and an electrode 150. The guide roll also has a rolling surface having a contact face 135 and depressions 260. The depressions 260 extend radially inward from the rolling surface with regard to the axis of the guide roll. The electrode 150 has an electrode foil 170 disposed between a first electrode coating 160 and a second electrode coating 180. The electrode coatings 160, 180 are electrically conductive. It is advantageous when the electrode 150 has been supplied with thermal energy prior to compression, and the electrode 150 is at a predetermined temperature in the compression. As a result, a lower level of mechanical stresses is built up within the electrode 150 during the compression. When the electrode 150 is conveyed through the guide roll 130, mechanical contact between the electrode 150 and the guide roll 130 can convey thermal energy from the electrode 150 to the guide roll 130. The depressions 260 have a thermally insulating effect here, such that the transfer of heat to the guide roll 130 is at least reduced. The thermal energy can be supplied to the electrode 150 via electrical induction (not shown here). When the electrode 150 is supplied with thermal energy by electrical induction during the rolling on the roll, and the guide roll 130, or its surface, is electrically conductive, a force acts from the electrode 150 onto the roll. In order to prevent this, it is advantageous when the guide roll is made from an electrically nonconductive material. The electrically nonconductive or insulating material may comprise a plastic or ceramic, for example.

Figures 8A, 8B:
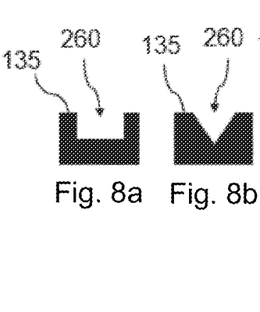
FIGS. 8a-8d show a schematic of different geometries of depressions in the guide roll.
Figure 8C:
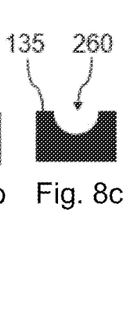
Figure 8D:
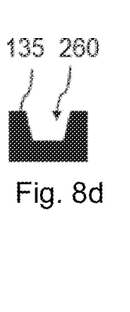

FIGS. 8*a*-8*d* show a schematic of different geometries of depressions 260 in the guide roll 130, which extend from the rolling surface inward. FIG. 8*a* shows a depression 260 with a rectangular cross section. The depression 260 may take the form of a groove, a cylinder or else a cuboid. FIG. 8*b* shows a depression 260 with a triangular cross section. The depression 260 may take the form of a groove or a cone. FIG. 8*c* shows a depression 260 with a semicircular cross section. The depression 260 may take the form of a groove or a hemisphere. FIG. 8*d* shows a depression with a trapezoidal cross section. The depression may take the form of a groove or a pyramid, especially a frustopyramid.

The invention is suitable for the production of electrodes for battery cells, especially for battery cells for motor vehicle batteries.

LIST OF REFERENCE NUMERALS

100 compaction apparatus
110 first compaction unit
120 second compaction unit
130 guide roll
135 contact face
140 winding roll
150 electrode
160 first electrode coating
165 uncoated region
170 electrode foil
180 second electrode coating
190 foil subregion
d1, d2, d12, d3, ds thicknesses of the electrode
x1, x2, x3, x4, x5, x6 region boundaries
210 relaxation module
210*a* relaxation module one
210*b* relaxation module two
210*c* relaxation module three
250 thermal energy source
260 depressions

The invention claimed is:

1. A calendering apparatus for mechanical compaction of an electrode, the calendering apparatus comprising:
a compacting device; and
a guide roll, wherein:
the guide roll is configured to feed the electrode to the compacting device in operation of the calendering apparatus,
the guide roll has first regions and second regions in sections on a rolling surface, and
the first regions and the second regions have different thermal conductivities.

2. The calendering apparatus according to claim 1, wherein the electrode is a two-dimensional electrode.

3. The calendering apparatus according to claim 1, wherein the guide roll has at least one thermally insulating depression in the first regions, and the at least one thermally insulting extends radially inward from the rolling surface in relation to an axis of the guide roll.

4. The calendering apparatus according to claim 3, wherein the at least one thermally insulating depression is in groove form, spherical form, hemispherical form or pyramidal form.

5. The calendering apparatus according to claim 3, wherein the guide roll has a plurality of thermally insulating depressions, and at least two of the thermally insulating depressions have different forms from one another.

6. The calendering apparatus according to claim 1, wherein the guide roll has an electrically nonconductive material on the rolling surface.

7. The calendering apparatus according to claim 6, wherein the electrically nonconductive material includes at least one of ceramic or plastic.

8. The calendering apparatus according to claim 3, wherein the guide roll includes at least one insulation element disposed in the at least one thermally insulating depression.

* * * * *